United States Patent
Bucksbee

(10) Patent No.: US 6,450,474 B1
(45) Date of Patent: Sep. 17, 2002

(54) X-CONFIGURATION ENGINE MOUNTING WITH LOCKING END PLATES

(75) Inventor: James H. Bucksbee, McKean, PA (US)

(73) Assignee: Lord Corporation, Cary, NC (US)

( * ) Notice: Subject to any disclaimer, the term of this patent is extended or adjusted under 35 U.S.C. 154(b) by 0 days.

(21) Appl. No.: 09/522,458

(22) Filed: Mar. 9, 2000

(51) Int. Cl.[7] .............................................. F16M 1/00
(52) U.S. Cl. ........................ 248/638; 248/637; 248/560; 248/609
(58) Field of Search ................................. 248/638, 637, 248/560, 609

(56) References Cited

U.S. PATENT DOCUMENTS

| | | | |
|---|---|---|---|
| 2,729,442 A | 1/1956 | Neidhart | |
| 2,891,744 A | 6/1959 | Hirst et al. | |
| 2,948,502 A | 8/1960 | Hutton | |
| 3,242,877 A | 3/1966 | Hirst et al. | |
| 4,183,496 A | 1/1980 | Brock et al. | |
| 4,504,036 A | 3/1985 | Passarell et al. | |
| 4,733,854 A | * 3/1988 | Miyamoto | 267/140.1 |
| 4,768,611 A | 9/1988 | Schmitt | |
| 5,116,030 A | * 5/1992 | Nowak et al. | 267/140.4 |
| 5,121,905 A | * 6/1992 | Mann et al. | 267/141.4 |
| 5,228,663 A | * 7/1993 | Adler et al. | 267/140.14 |
| 5,651,535 A | * 7/1997 | David | 267/140.5 |
| 5,722,631 A | * 3/1998 | Dorton | 248/635 |
| 5,842,687 A | * 12/1998 | David | 251/140.5 |
| 5,944,297 A | 8/1999 | Flower et al. | |
| 6,019,342 A | 2/2000 | Pelle | 248/562 |

FOREIGN PATENT DOCUMENTS

| | | | |
|---|---|---|---|
| EP | 0 342 074 A1 | * | 11/1989 |
| FR | 2 768 661 A1 | * | 3/1999 |
| GB | 1 516 572 | | 7/1978 |

* cited by examiner

Primary Examiner—Korie Chan
Assistant Examiner—Ingrid Weinhold
(74) Attorney, Agent, or Firm—Michael M. Gnibus

(57) ABSTRACT

A mount for isolating a vibrating member from its support. In several embodiments an elastomeric element is made up of four components that are preferably bonded to the inclined outer surface of an inner member and the inclined inner surface of an outer member. One of the inner and outer members is bifurcated and drawing the two halves into mating engagement results in the elastomeric components being preloaded simultaneously in compression and shear. The elastomeric element is preferably formed with portions which snub movement in each of three orthogonal directions. The dimensions of the pair of elastomeric components above or below the vibrating member may be different than the other pair due to greater compression strain on one pair of components to maintain maximum design stress levels. In another embodiment, the inner and outer members are each a single component with four elastomeric elements bonded between metal plates and preloaded between the inner and outer surfaces of the members in an X-like configuration. In still another embodiment of the X-configuration the metal plates have turned-out ends for gripping the members. The inclined surfaces have grooves for preventing, in concert with the turned-out ends, displacement and complete dislodgment of the inner member. The base of the outer member alternatively has extended sides for reducing bending stresses in the bolts which fasten it to the support.

17 Claims, 18 Drawing Sheets

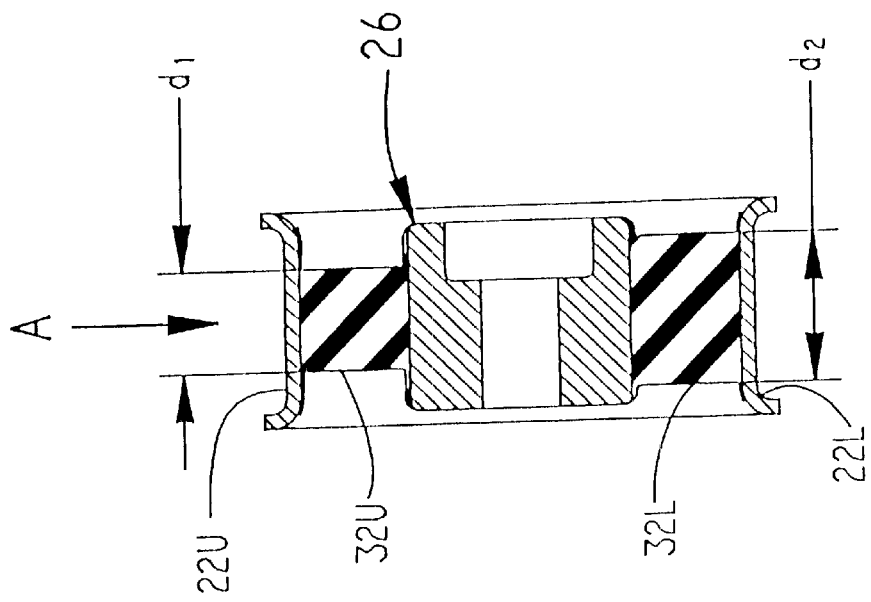
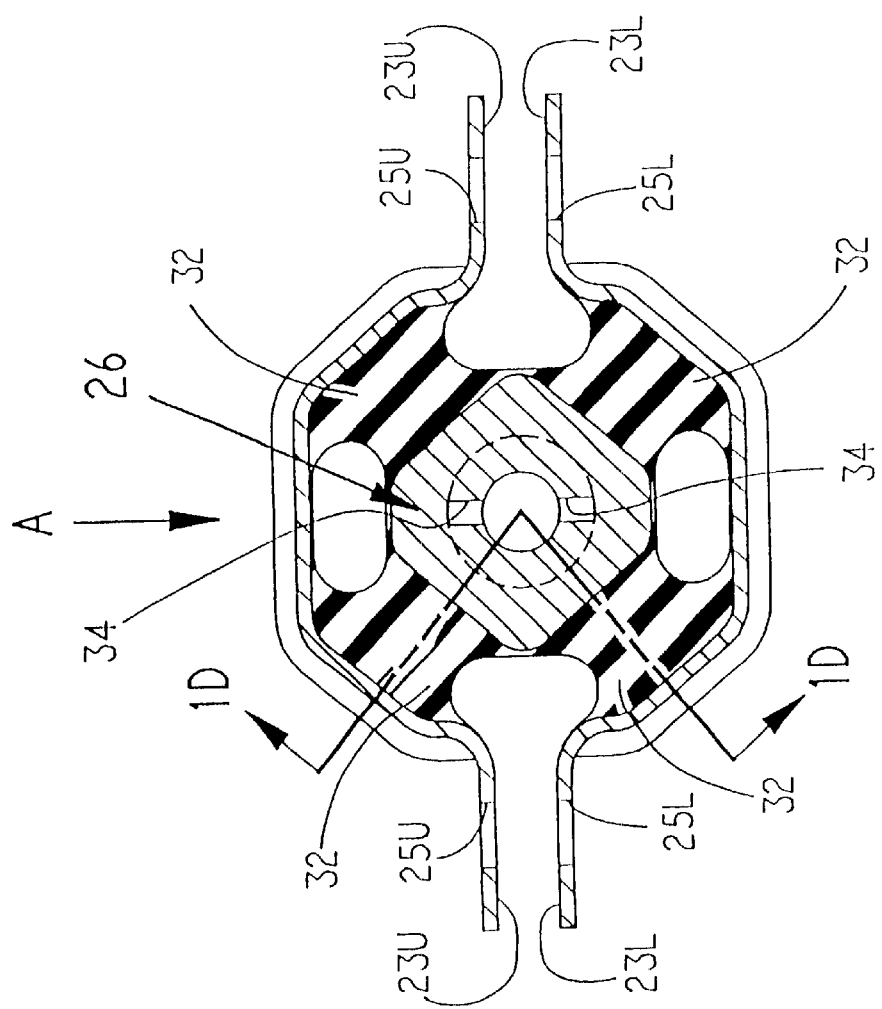

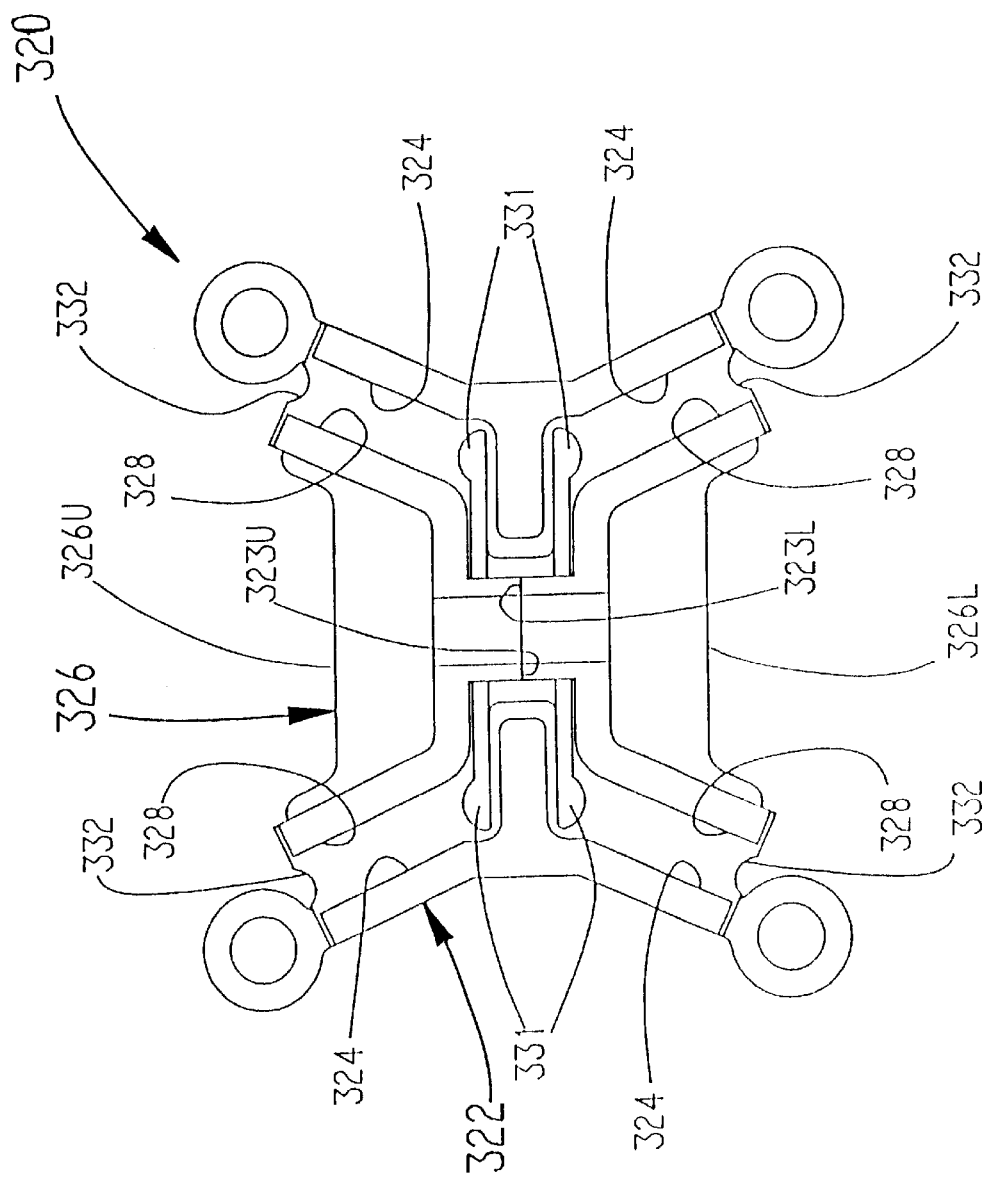

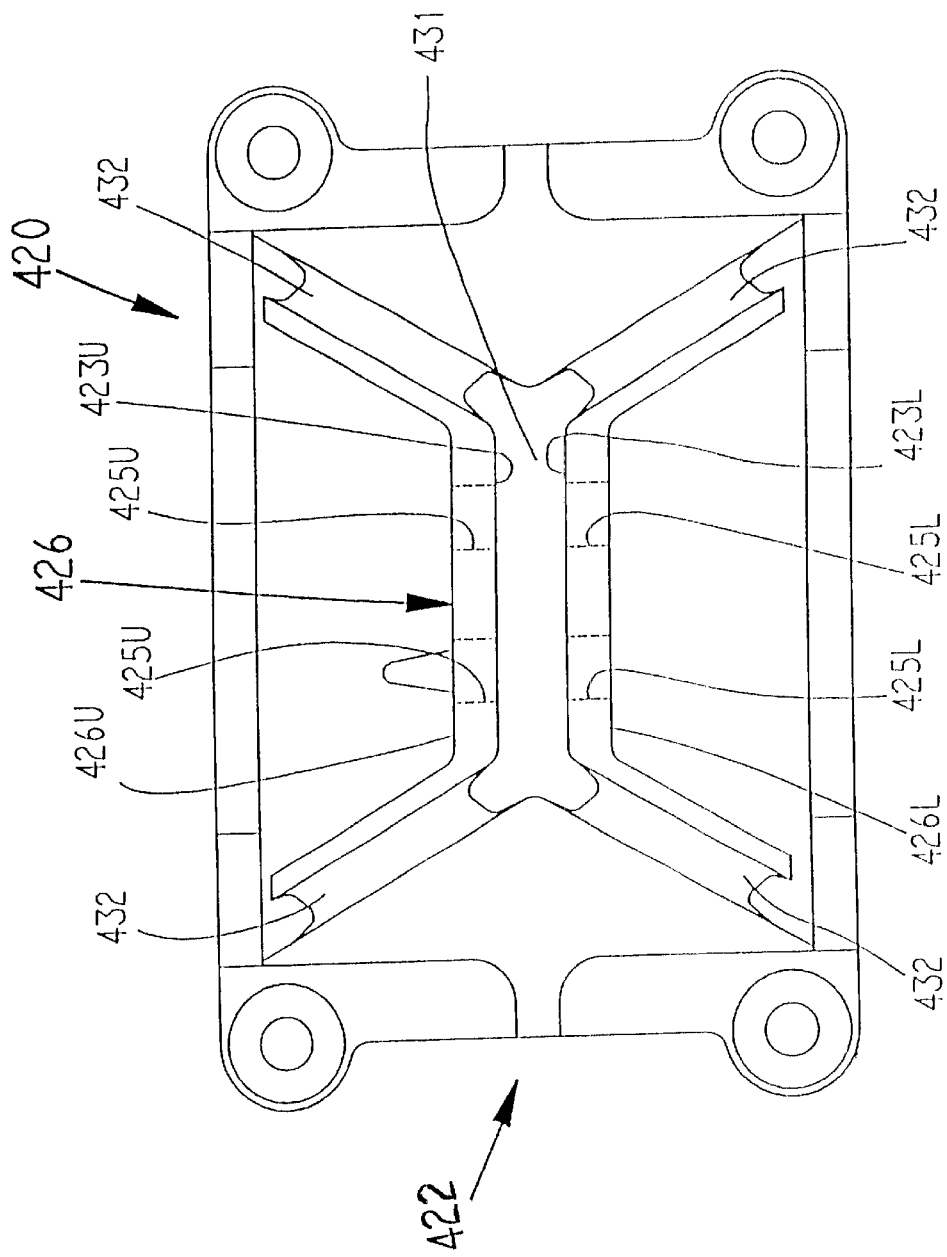

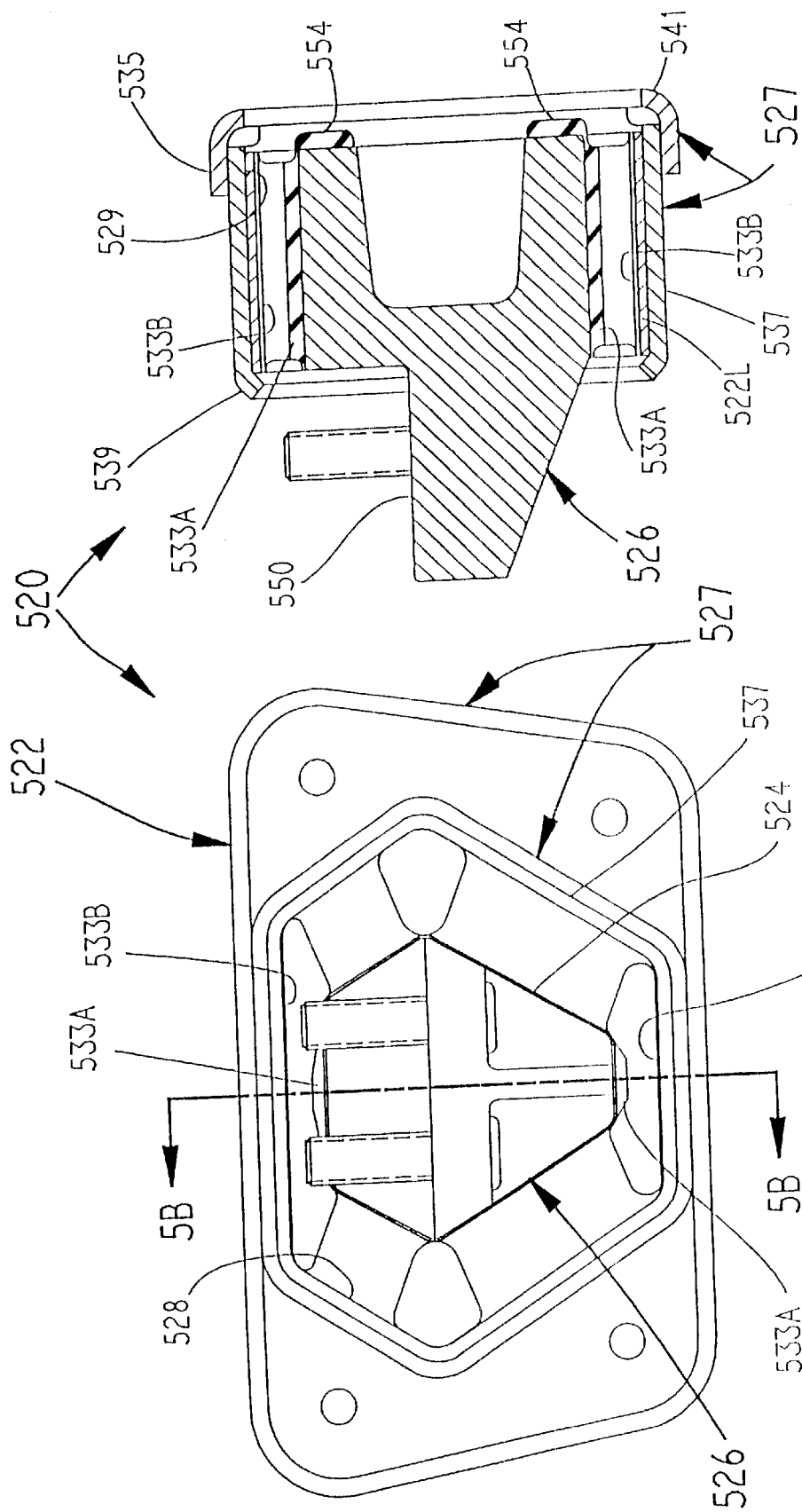

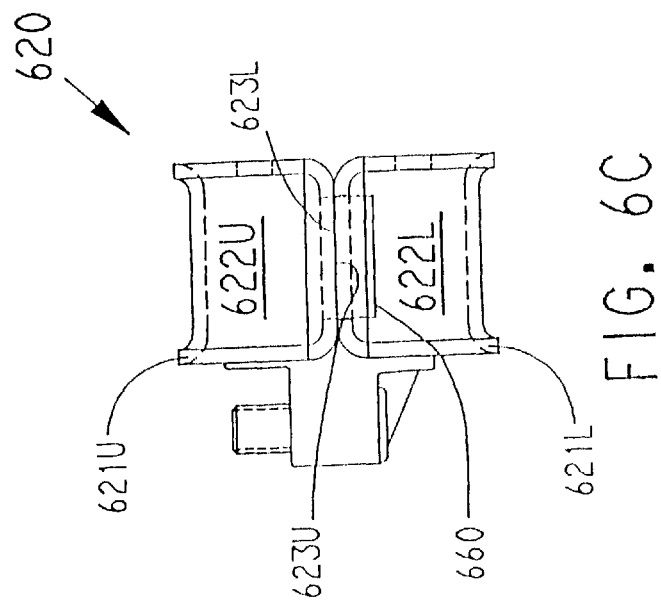
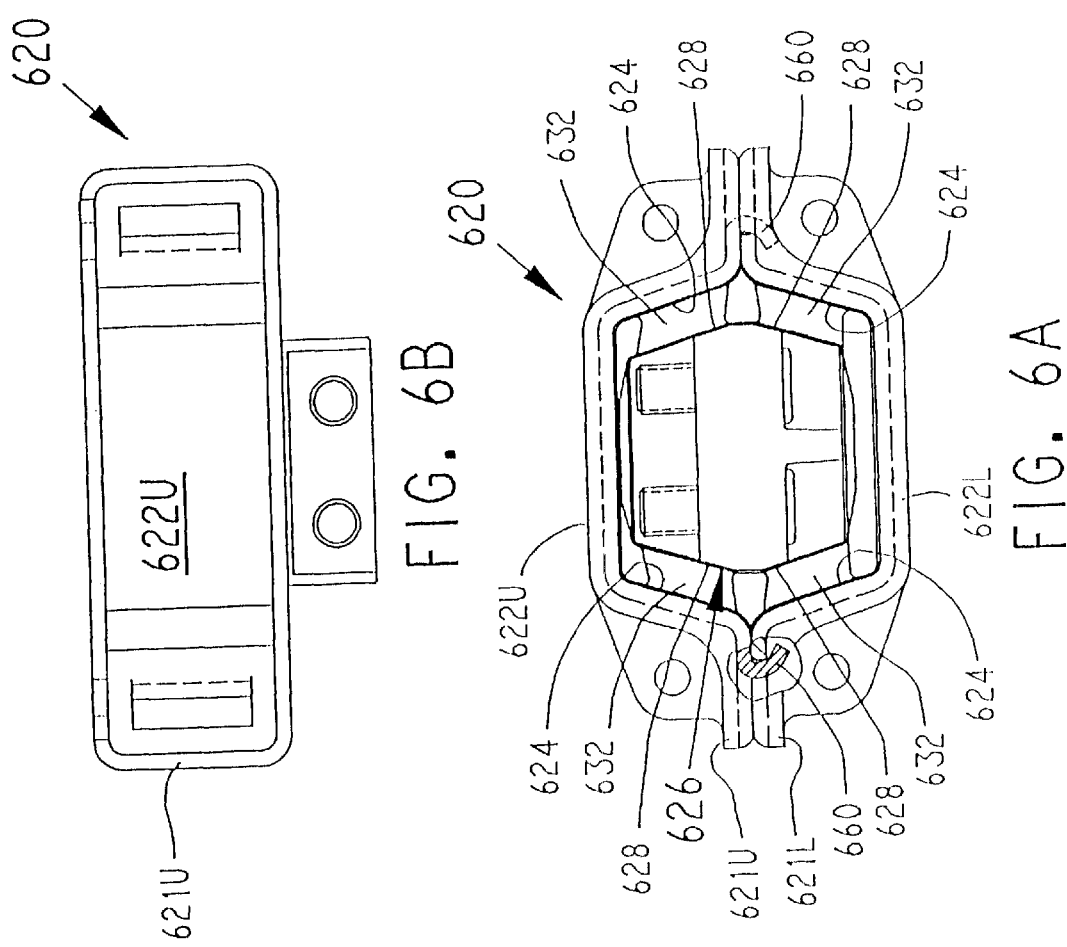

FIG. 9A
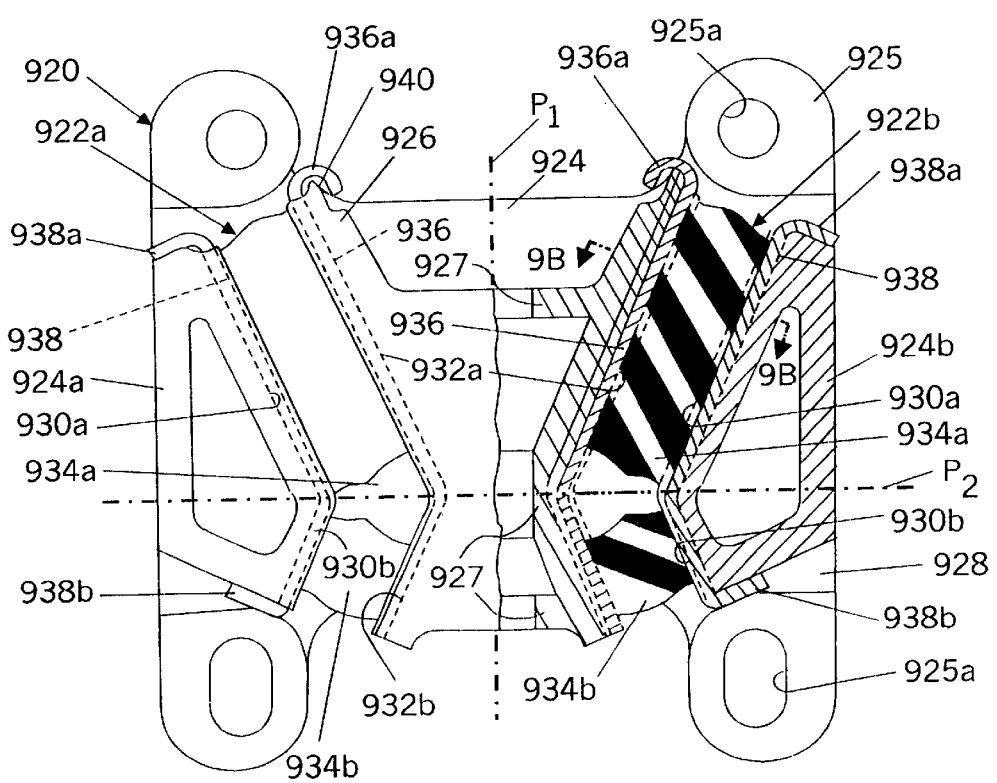
FIG. 9B
FIG. 9C
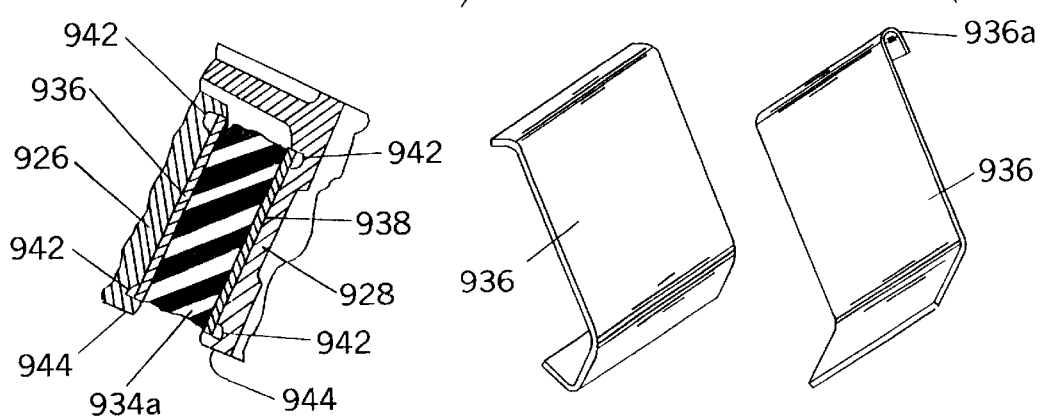

X-CONFIGURATION ENGINE MOUNTING WITH LOCKING END PLATES

BACKGROUND AND SUMMARY OF THE INVENTION

The present invention is directed to an elastomeric mount of the type used to support and isolate an engine from a vehicle chassis. More particularly the present invention is directed to a mount which has four preferably inclined elastomeric elements, each of which is simultaneously preloaded in compression and shear.

In applications involving on- and off-highway equipment, elastomeric mounts must be rugged to take the pounding from traversing unimproved roads. In addition, these mounts should be designed to avoid total disconnect of the power train from the support in the event of elastomer failure (i.e., they are safetied). Finally, the provision of snubbing in all three orthogonal directions protects the power train, improves subjective ride quality and reduces unwanted chatter caused by metal-to-metal contact.

The mount of the present invention provides a safetied design that uses four preferably inclined elastomeric elements which are formed by spaced laterally extending compartments, and the elastomeric elements preferably being mechanically locked or bonded to four outwardly facing faces of an inner member and to the four opposing inwardly facing faces of an outer member. Even should the elastomeric elements all fail, the inner member will be retained within the outer member. In several of the described embodiments, either of the inner or outer member are bifurcated into separate elements and, in preassembled condition, the elements are spaced such that opposed mating surfaces of the upper and lower elements are non-engaging. In its final assembled position, the two mating surfaces are brought together, preferably into engaging contact resulting in each of the elastomeric components experiencing preloading in both the compressive and shear directions. In Another embodiment, the inner and outer members are each one element, and the elastomeric components are bonded between parallel plates and preloaded between the opposing faces of the members. This preload results in superior wear life of the elastomeric elements. Snubbing is preferably provided in each of the two vertical and the fore/aft (not lateral) directions to eliminate metal-to-metal contact and resulting mechanical chatter.

In one embodiment, the opposing surfaces of the inner and outer members are designed to be non-planar in order to increase the stiffness of the mount in a lateral direction. In other embodiments, auxiliary lateral elements are used. This increase in spring rate raises the natural frequency of the mounting system out of an undesirable frequency range defined by the vehicle structure. In yet other embodiments, the bifurcated elements of the outer member interengage to maintain the mount in its assembled condition prior to installation. In still another embodiment, chevron-shaped elastic assemblies are each formed in an X-configuration as separate elastomeric elements bonded between parallel edge plates for maximizing mold capacity, and for reducing manufacturing cost. Precompression of the elastic assemblies between the inner and outer members serves to increase load-carrying capacity. To prevent the elastic assemblies in the X-configuration due to repetitive loading from being displaced and completely dislodged from between the opposing inner and outer members of the engine mounting, another embodiment is provided in which retaining plates on opposite faces of the elastomeric elements are formed with turned-out ends which grip respective adjacent edges of the inner and outer members. An alternative configuration of the outer member is also provided whereby the loading on each bolt attaching the outer member to a support structure is more in tension than in bending.

Various other features, advantages and characteristics of the present invention will become apparent after a reading of the following specification.

BRIEF DESCRIPTION OF THE DRAWINGS

The accompanying drawings which form a part of the specification, illustrate several key embodiments of the present invention. The drawings and description together, serve to fully explain the invention.

FIG. 1C is a cross-sectional front view of the first embodiment of the mount shown in the pre-installed condition.

FIG. 1D is cross-sectional side view of one elastomeric component of the mount of the present invention as seen along line 1D—1D in FIG. IC.

FIG. 4A is a front view of a fourth embodiment of the mount with a bifurcated inner member.

FIG. 4B is a front view of a fifth embodiment of the mount of the present invention similar to the fourth embodiment.

FIG. 5A is a front view of a sixth embodiment of the mount.

FIG. 5B is a cross-sectioned side view of the sixth embodiment along a section line 5B—5B shown in FIG. 5A.

FIG. 6A is a front view of a seventh embodiment of the mount.

FIG. 6B is a top view of the seventh embodiment of the mount.

FIG. 6C is a side view of the seventh embodiment of the mount.

FIG. 9A is a front view, partly in vertical cross section, of a tenth embodiment according to the invention, similar to the ninth embodiment but with modified elastic assemblies and inner and outer members.

FIG. 9B a partial cross-sectional view of the mount of FIG. 9A taken in a plane along the line 9B—9B.

FIG. 9C is an isometric view of opposed retainer plates in the elastic assemblies of FIG. 9A.

DETAILED DESCRIPTION OF THE PREFERRED EMBODIMENTS

Figure 1B:
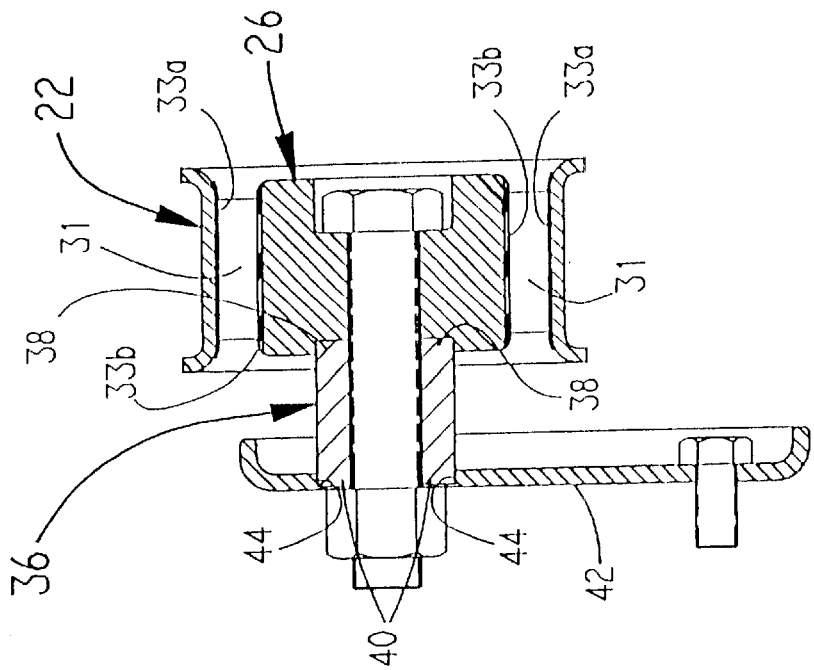
FIG. 1B is a cross-sectional side view of the first embodiment taken along line 1B—1B as seen in FIG. 1A.
Figure 1A:
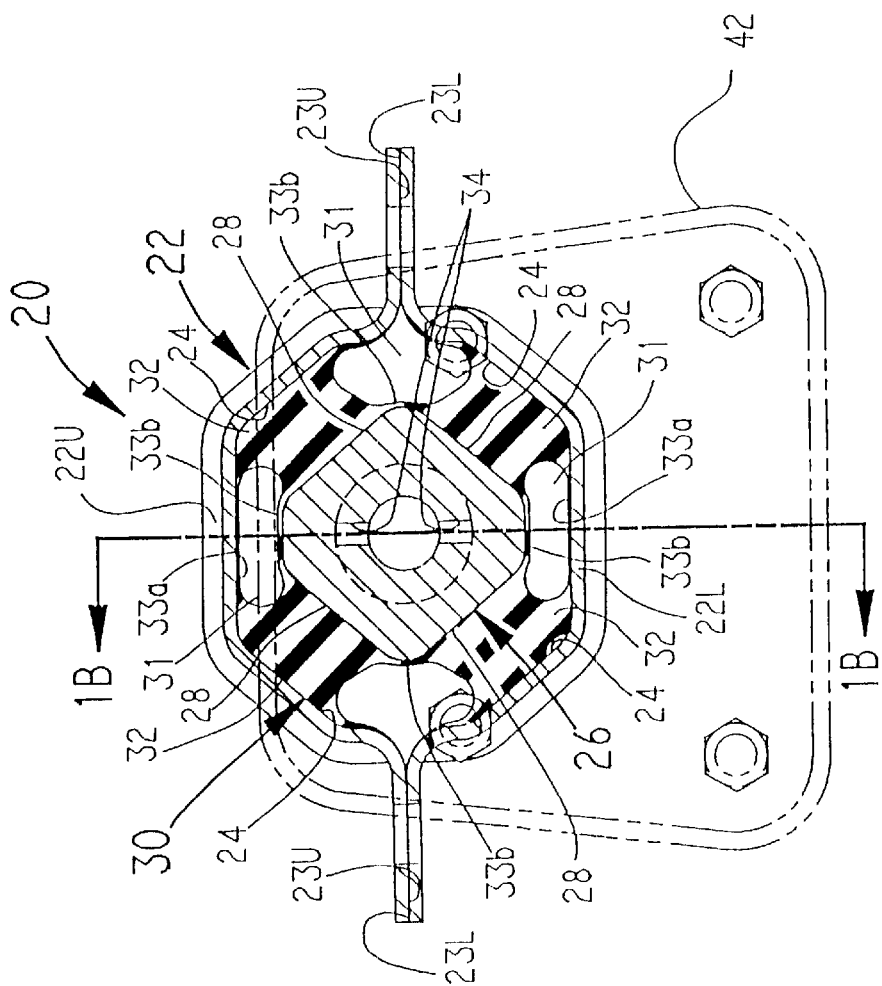
FIG. 1A is a cross-sectional front view of a first embodiment of the mount of the present invention.

A first embodiment of the mount of the present invention is depicted in FIGS. 1A–1D generally at 20. Mount 20 includes outer member 22, inner member 26 encircled by outer member and an elastomeric element 30. Inner member 26 has four outwardly facing inclined surfaces 28 which oppose four inwardly facing inclined surfaces 24. Elastomeric element 30 is comprised of four preferably interconnected components 32, one each of which is positioned between and, preferably bonded to, inclined surfaces 24 and 28. In this embodiment, outer member 22 is bifurcated into upper element 22U and lower element 22L which have first (23U) and second (23L) mating surfaces, respectively. Elastomeric components 32 are spaced apart and separated by laterally extending compartments 31 while preferably being interconnected by elastomeric webs 33a and 33b. Webs 33a and 33b offer corrosion inhibiting coating to all otherwise exposed metallic surfaces on the outer (22) and inner (26) members with the further advantage of preventing metal-to-metal contact.

As best seen in FIG. 1C, in its partially assembled condition, the thicknesses of the elastomeric components 32 are large enough such that the mating surfaces 23U and 23L are in non-engaging relationship. When bolts are inserted through apertures 25U, 25L formed in mating surfaces 23U, 23L, respectively, and those surfaces are drawn into contact, elastomeric components 32 are simultaneously preloaded in compression and shear to increase the durability of the elastomer (i.e., to extend its wear-life).

Now referring to FIGS. 1B and 1C, inner member 26 has a pair of notches 34 formed in one end which receive a pair of protrusions 38 extending from one end of an anti-rotation spacer 36. A like pair of protrusions 40 extending from the opposite end of spacer 36 are received in slot openings 44 in an adapter plate 42 which can be bolted to the engine or the support (not shown). The mating surfaces 23U and 23L are bolted to the other of said engine and said support. Typically, the inner member 26 will be attached to the engine and the outer member 22 to the support.

FIG. 1D is a cross-sectional view of the mount shown in FIG. 1C as seen along a section line 1D—1D. Since the static engine load (acting along a direction indicated by arrow A) creates increased compression strain on the lower elastomeric components 32L, those components will be more critical in providing the desired stiffness control of the mount than upper components 32U. Generally, a higher stiffness will be required in the lower elastomeric component 32L than in the upper 32U to deter drift of the mount 20. Accordingly, it is an option to lessen the amount of elastomer in upper components 32U as depicted in FIG. 1D by making the width $d_1$ of components 32U unequal to (preferably less than) the width $d_2$ of lower components 32L.

Figures 2A, 2B:
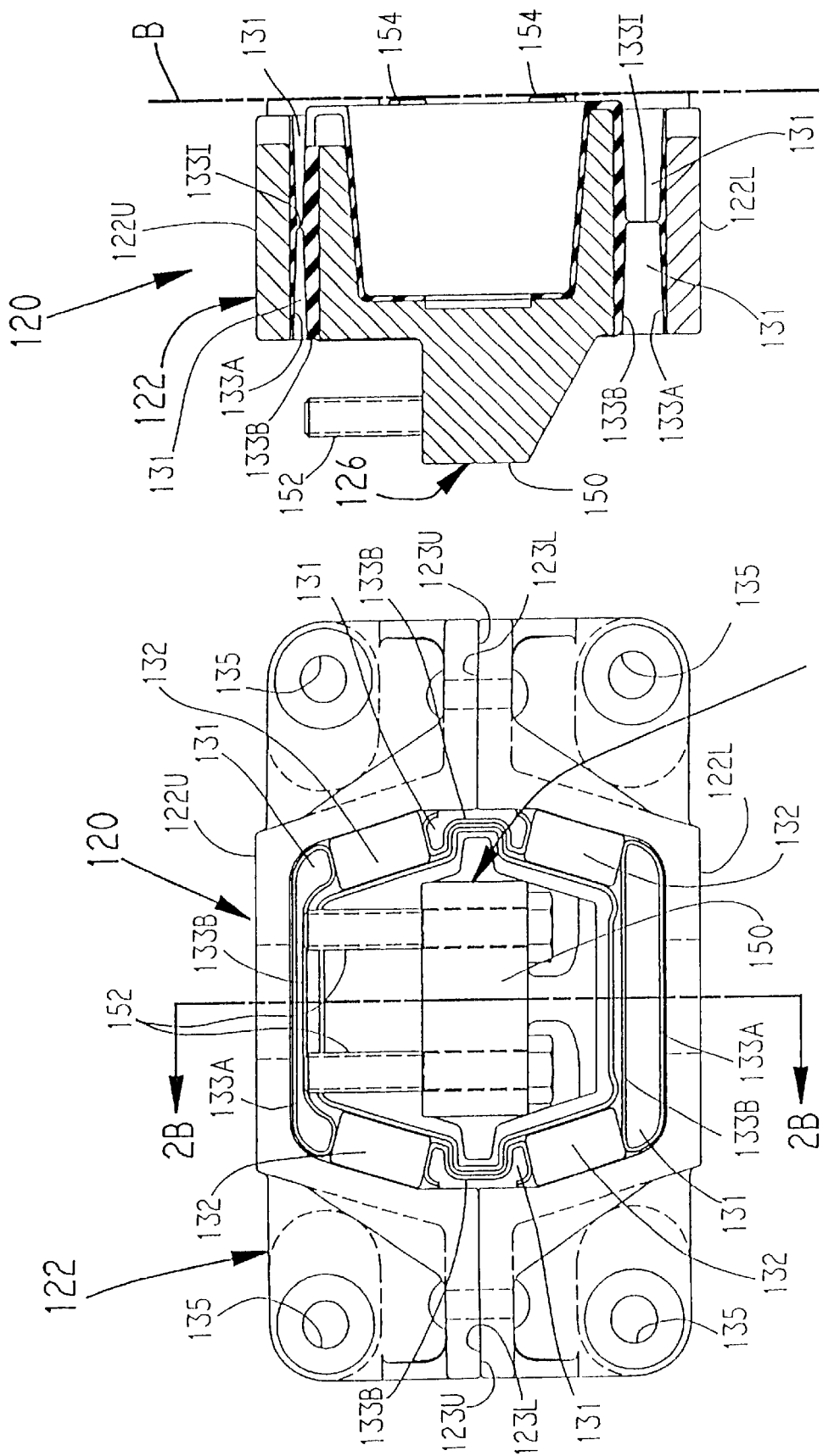
FIG. 2A is front view of a second embodiment of mount.
FIG. 2B is a cross-sectional side view of the second embodiment as seen along line 2B—2B in FIG. 2A.
Figure 2C:
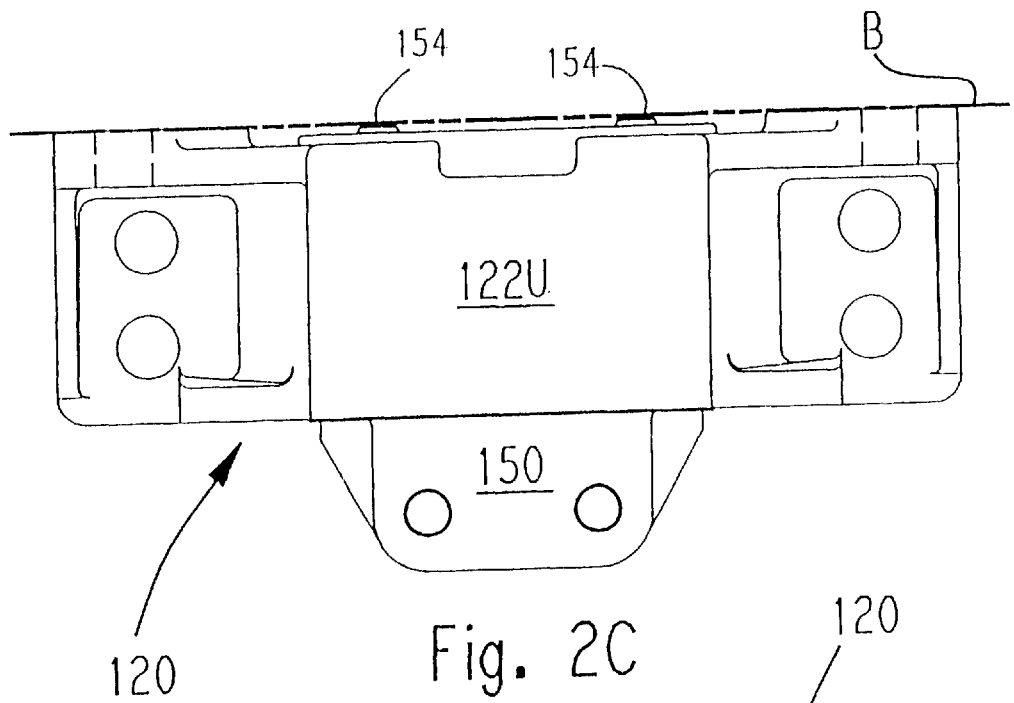
FIG. 2C is a top view of the second embodiment of mount.
Figure 2D:
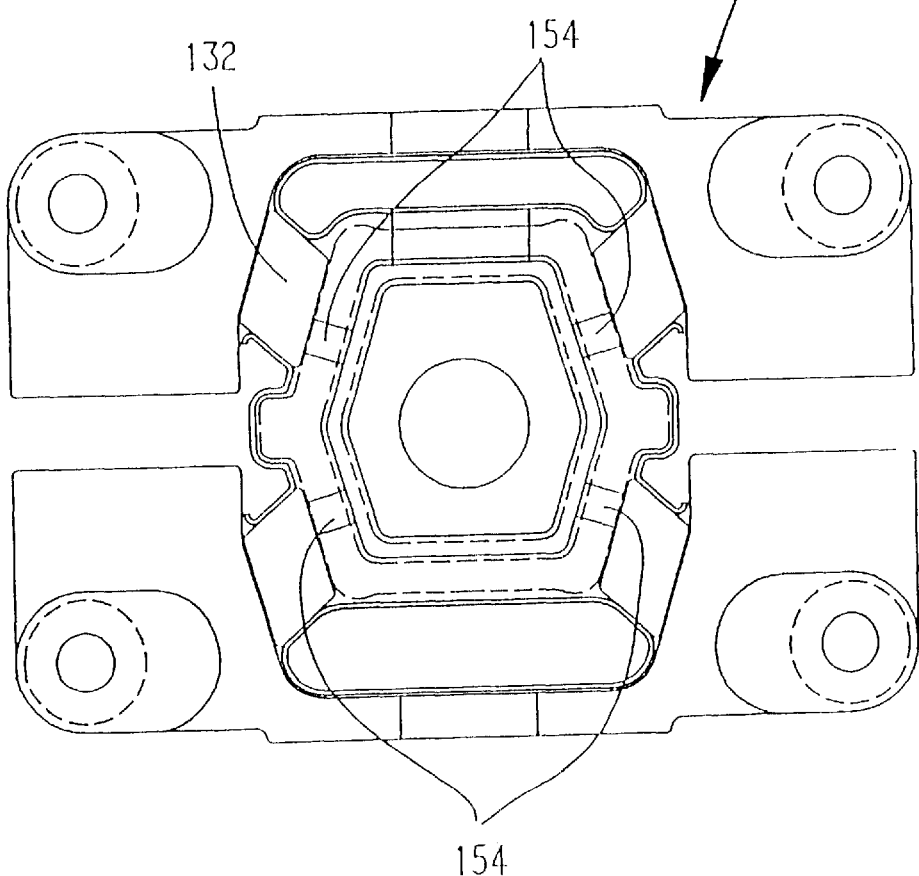
FIG. 2D is a back view of the second embodiment of the mount of the present invention shown in pre-installed condition.

A second embodiment of the mount of the present invention is shown in FIGS. 2A–2D generally at 120. This second embodiment of the mount 120 is also a split (bifurcated) outer member design employing upper element 122U and lower element 122L. Holes 135 are used to bolt the outer member 122 to the support frame, commonly a truck chassis. The inner member 126 is best seen in FIG. 2B. Compartments 131 are formed by the use of cores in the mold and an intermediate web 133I interconnects outer web 133A and inner web 133B. A laterally extending shelf 150 offset from outer member 122 protrudes from the front side of inner member 126 and provides a means for securing mount 120 to the engine (not shown). A flange extends from the engine and apertures formed therein receive the bolts 152. The apertures in the flange may be threaded to receive bolts 152 or the apertures may be through bores and nuts may be used to effect attachment.

As in the case of the first embodiment, when the mating surfaces 123U, 123L are drawn together from their pre-assembled condition (shown in FIG. 2D) to their fully assembled position shown in FIG. 2A, elastomeric components 132 are simultaneously preloaded in compression and shear. Rivets shown urge the mating surfaces 123U, 123L into contact and maintain precompression of the mounting 120 when not installed. Movement of the inner member 126 relative to outer member 122 will be snubbed in all three orthogonal directions. Vertical movement is snubbed by compression of the intermediate web 133I and the engagement of outer web 133A with inner web 133B. Fore-and-aft movement will be snubbed by the engagement of the elastomeric web 133B encasing inner member 126 with the fore-and-aft inner surfaces of outer member 122. A plurality of elastomeric protrusions 154 (FIGS. 2C, 2D) are formed on the outward face (away from the engine and toward frame) of inner member 126 and will snub lateral motion against the support frame (whose position is indicated by dotted line B in FIGS. 2C and 2B). This three axis snubbing prevents mechanical chatter caused by engine vibration during operation and prevents overloading the elastomeric components 132. The variation discussed in connection with the first embodiment of varying the width of the upper elastomeric components 132 relative to the lower ones is applicable to this embodiment and those that follow, as well.

Figure 3A:
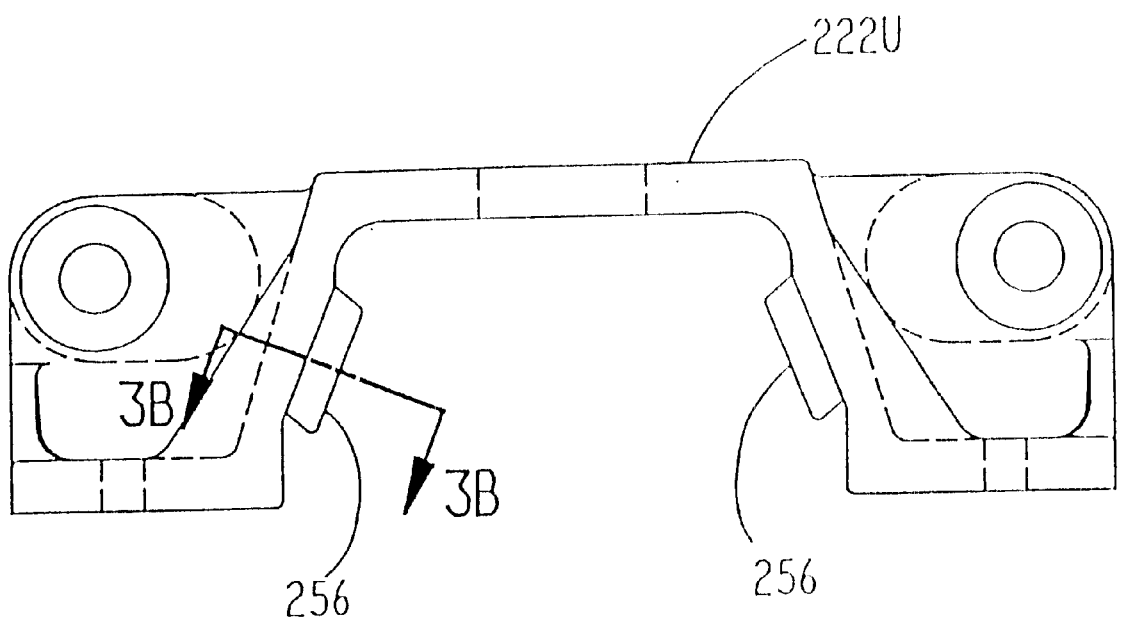
FIG. 3A is a front view of an upper portion of the bifurcated outer member of the mount of a third embodiment of the mount.
Figure 3B:
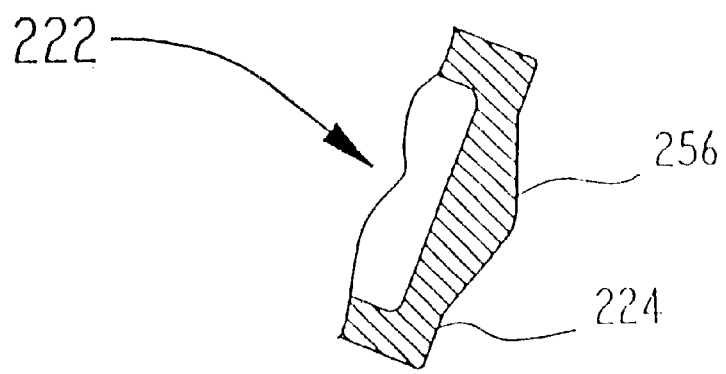
FIG. 3B is an enlarged cross-sectional side view of a portion of the outer member as seen along line 3B—3B in FIG. 3A.
Figure 3C:
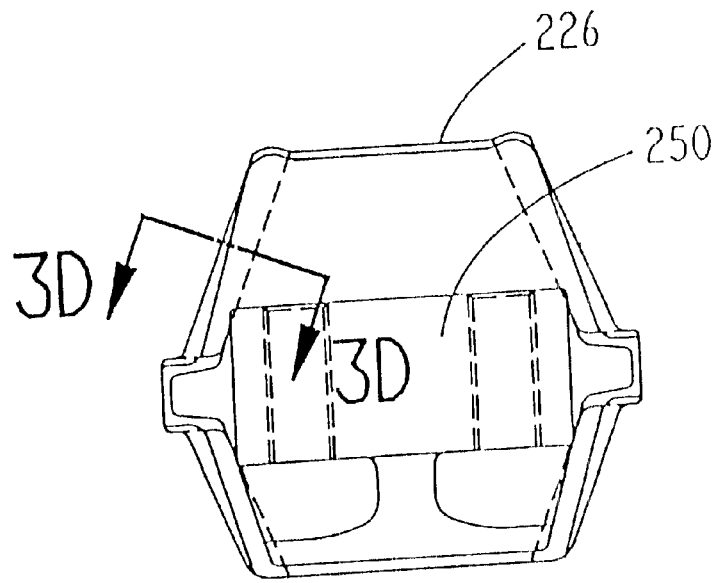
FIG. 3C is a front view of the inner member of the third embodiment of the mount.
Figure 3D:
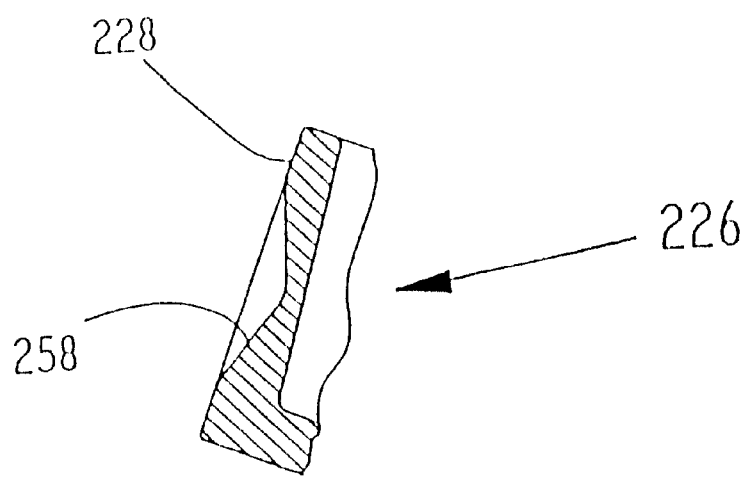
FIG. 3D is an enlarged cross-sectional side view of a portion of the inner member as seen along line 3D—3D of FIG. 3C.
Figure 3E:
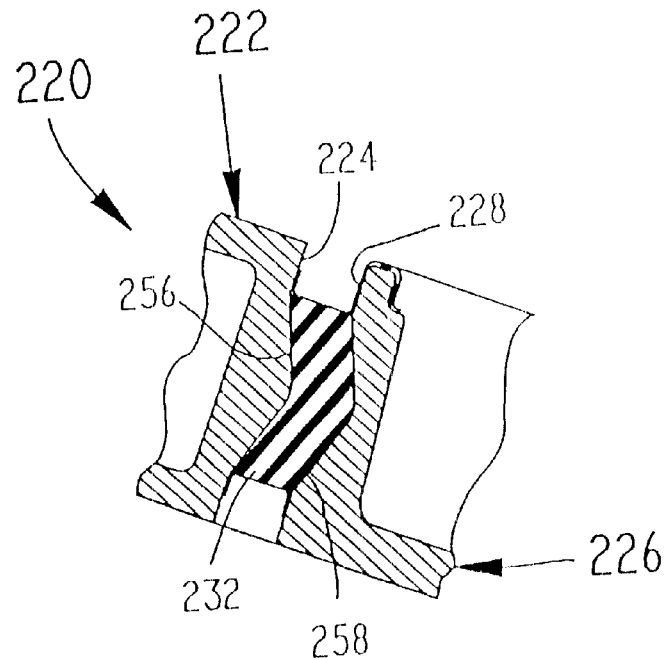
FIG. 3E is an enlarged cross-sectional side view of the third embodiment of the mount showing the nonplanar opposing pairs of surfaces.

Portions of a third embodiment of the present invention are shown in FIGS. 3A–3E generally at 220. For some applications, it is desired to increase the lateral shear stiffness of the mount 220. This embodiment affords the desired increase in stiffness by providing the opposing surfaces 224, 228 on the outer (222) and inner (226) members with a non-planar configuration. As best seen in FIG. 3E, the configuration depicted is a laterally oriented V-shaped although other non-planar configurations, such as arcuate, might also be used. The elastomeric element 232 is deformed into a V shape by protrusion 256 and valley 258. These non-planar surfaces 224 and 228 will be formed on both upper element 222U (FIG. 3A) and lower element (not shown) and on inner (226) member. The shear stiffness of elastomeric elements 232 will be increased in the lateral direction transverse to the V.

Figure 3F:
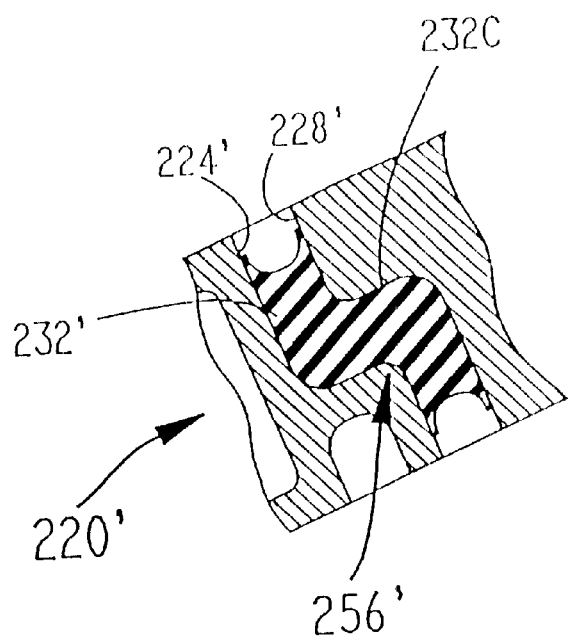
FIG. 3F is a cross-sectional side view of a third nonplanar modification to the third embodiment of the mount.

A modification to the third embodiment is shown in FIG. 3F generally at 220'. Should the use of a chevron or V-shape to the elastomer be insufficient to produce a large enough increase in the stiffness in the lateral shear direction, an S-shaped protrusion 256' can be employed between outer surface 224' and inner surface 228'. This essentially inserts a compressive section 232C in the lateral direction and enables a larger incremental increase in the stiffness to be added without increasing the stiffness of the elastomer in elastomeric element 232'.

Figure 3H:
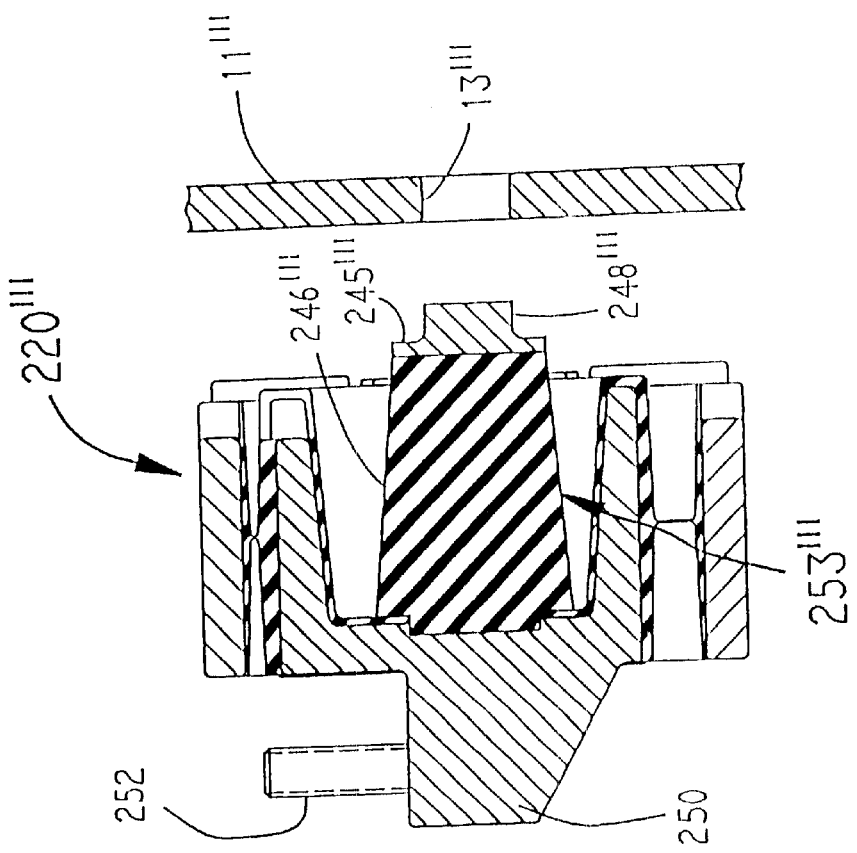
FIG. 3H is a cross-sectional side view of a second lateral stiffness modification to the third embodiment of the present invention.
Figure 3G:
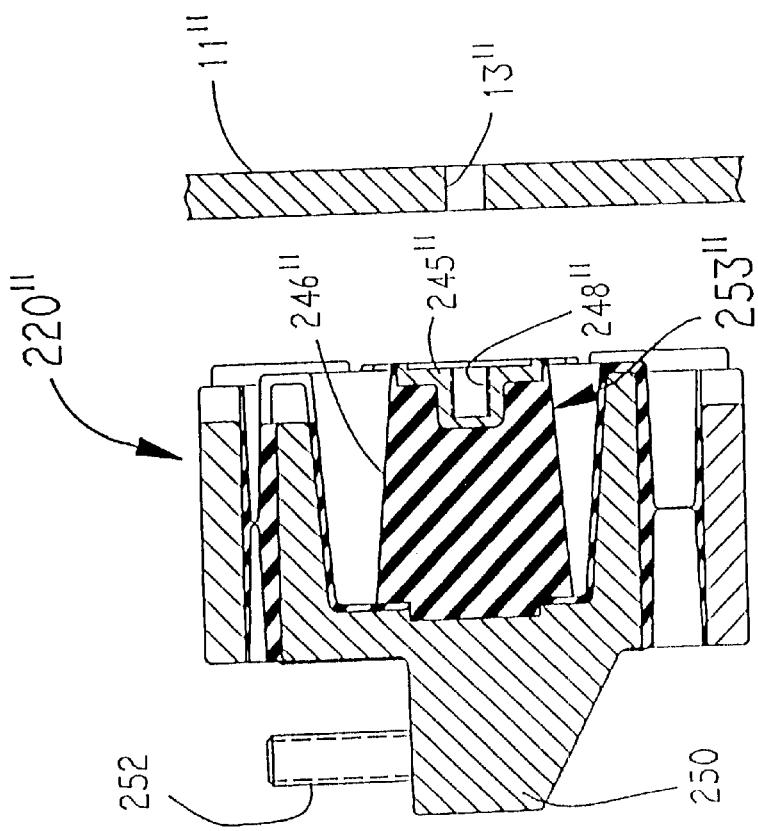
FIG. 3G is a cross-sectional side view of a lateral stiffness modification to the third embodiment of mount.

Second and third modifications to the third embodiment are shown in FIGS. 3G and H, respectively. In the mount 220" shown in FIG. 3G, lateral stiffness is added to the mount 220" by the addition of a separate laterally extending element 253". The laterally extending element 253" includes an elastomer element 246" bonded to a plate 245" which has means for interconnecting to the chassis 11". For example, a threaded bore 248" in plate 245" receiving a fastener (not shown) inserted through opening 13" in chassis 11". Optionally, as is shown in FIG., 3H, a protruding boss 248''' formed on plate 245''' that engages in an opening 13''' in chassis 11''' may be used. Notably, use of a fastening bolt is rendered unnecessary by providing an axial preload on the laterally extending element 253''' thereby precompressing lateral elastomeric element 246''' when mount 220''' is bolted to chassis 11'''. This preload will provide additional stiffness to the mount in this lateral direction, enabling the mount 220''' to meet the required stiffness criteria. In the two modifications depicted in FIGS. 3G and 3H, lateral stiffness can be added without having to affect the stiffness of the elastomer used in the precompressed elastomeric elements. As before, shelf 250 including bolts 252 attaches to the engine.

A fourth embodiment is depicted in FIG. 4A and is identified at 320. In this embodiment, the outer member 322 is one piece and inner member 326 is split (bifurcated). Mating surfaces 323U and 323L are formed on upper element 326U and lower element 326L, of inner member 326 respectively. The outer member 322 no longer surrounds the inner member 326, as was the case in the previous embodiments. Rather, the reacting faces 324 of the outer member 322 are seemingly reversed, such that the surfaces 324 of the outer member are divergent and the actual halves of the inner member no longer form a closed perimeter either but have outwardly directed arms in which surfaces 328 are generally parallel to inwardly directed surfaces 324. The elastomeric components 332 then, too, are reversed so as not to form a closed polygon. Four laterally extending compartments 331 afford some room for movement of the inner member 326 relative to the outer member 322 before snubbing occurs. In this embodiment, it is the drawing of the mating surfaces 323U and 323L on the inner member 326 into contact that results in the preloading in the compressive and shear directions in the elastomeric elements 332. Snubbing is provided in all three orthogonal directions.

A fifth embodiment of mount 420 is shown in FIG. 4B. This embodiment, also has a split inner member 426 shown here in its pre-assembled position with elastomeric components 432 in an unloaded condition. In this embodiment, the mating surfaces 423U, 423L on upper (426U) and lower (426L) elements extend the full length of the bottoms of trough-shaped inner components 426U, 426L. When drawing down takes place during engine installation by inserting bolts or the like, into holes 425U, 425L, compartment 431 will be eliminated forming two smaller residual compartments at the ends of mating surfaces 423U, 423L. In these last two embodiments, an engine bracket is secured to the mount 320, 420 via bolts through the inner member holes 425U, 425L. The four holes shown through the outer members 322, 422 attach mounts 320, 420 to the frame.

Figure 5C:
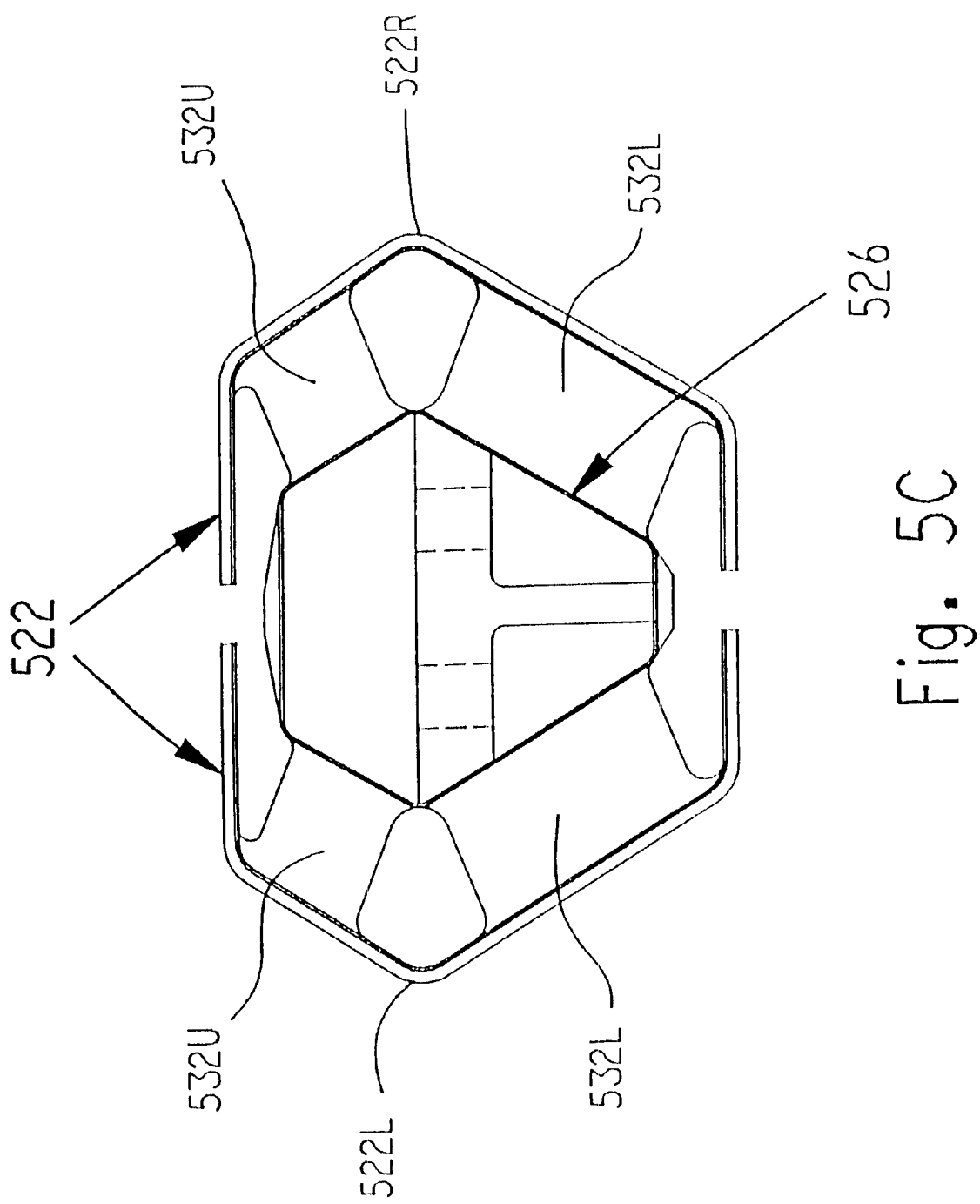
FIG. 5C is a front view of a sixth embodiment of the mount shown in a preassembled condition.

A sixth embodiment is depicted in FIGS. 5A and 5B generally at 520. Outer surfaces 524 of inner member 526 are partially radiused as are the corners of the inner surfaces 528 of outer member 522. The outer member 522 is shown in its preassembly configuration in FIG. 5c. Outer member 522 is bifurcated into light sleeve portions 522R and left sleeve portions 522L which are precompressed together, thereby precompressing elastomer components 532U, 532L simultaneously in compression and shear. Once precompressed, the sleeves 522L, 522R are slid into, and received within, a pocket 529 formed in retaining plate 527. A projecting portion 537, which has pocket 529 formed therein, is welded to lip portion 535 of base plate 541 to form retaining plate 527. The right and left sleeve portions 522R, 522L are retained laterally within pocket 529 in retaining plate 527 by staking the edge of the projecting portion 537 at its terminal end 539. As with earlier embodiments, a shelf 550 provides a surface for attaching the engine. In this embodiment, the outer member 522 comprises retaining plate 527 and right and left sleeve portions 522R, 522L. Vertical snubbing is accomplished by inner web 533A contacting outer web 533B on portions of sleeves 522R, 522L. Lateral snubbing is dictated by elastomer protrusions 554 formed on the frame side of inner member 526. Fore-and-aft snubbing occurs when inner member 526 contacts fore-and-aft surfaces of sleeves 522R, 522L.

A seventh embodiment of the present invention is shown in FIGS. 6A–6C generally at 620. The basic configuration is similar to that of the second embodiment with inclined elastomeric components 632 being compressed between generally parallel surfaces 624, 628. As with the sixth embodiment, this design includes means to hold the mount 620 in its fully assembled condition without using fasteners. In this embodiment, a pair of fold-over tangs 660 are employed to retain engagement of the overlapping mating surfaces 623U, 623L. Upper element 622U is identical to lower element 622L (except for the tangs 660 being trimmed from the lower element) and hence, the tooling costs for producing these identical metal stampings can be greatly reduced. Inner member 626 will move downwardly under the engine load to a more centered position for better snubbing performance. An additional benefit of this embodiment is that the flanges 621U, 621L are continuous around the part enhancing the overall strength of the metallic elements of the mount 620. The metal used is preferably aluminum to reduce the weight of the mount.

Figures 7A, 7B:
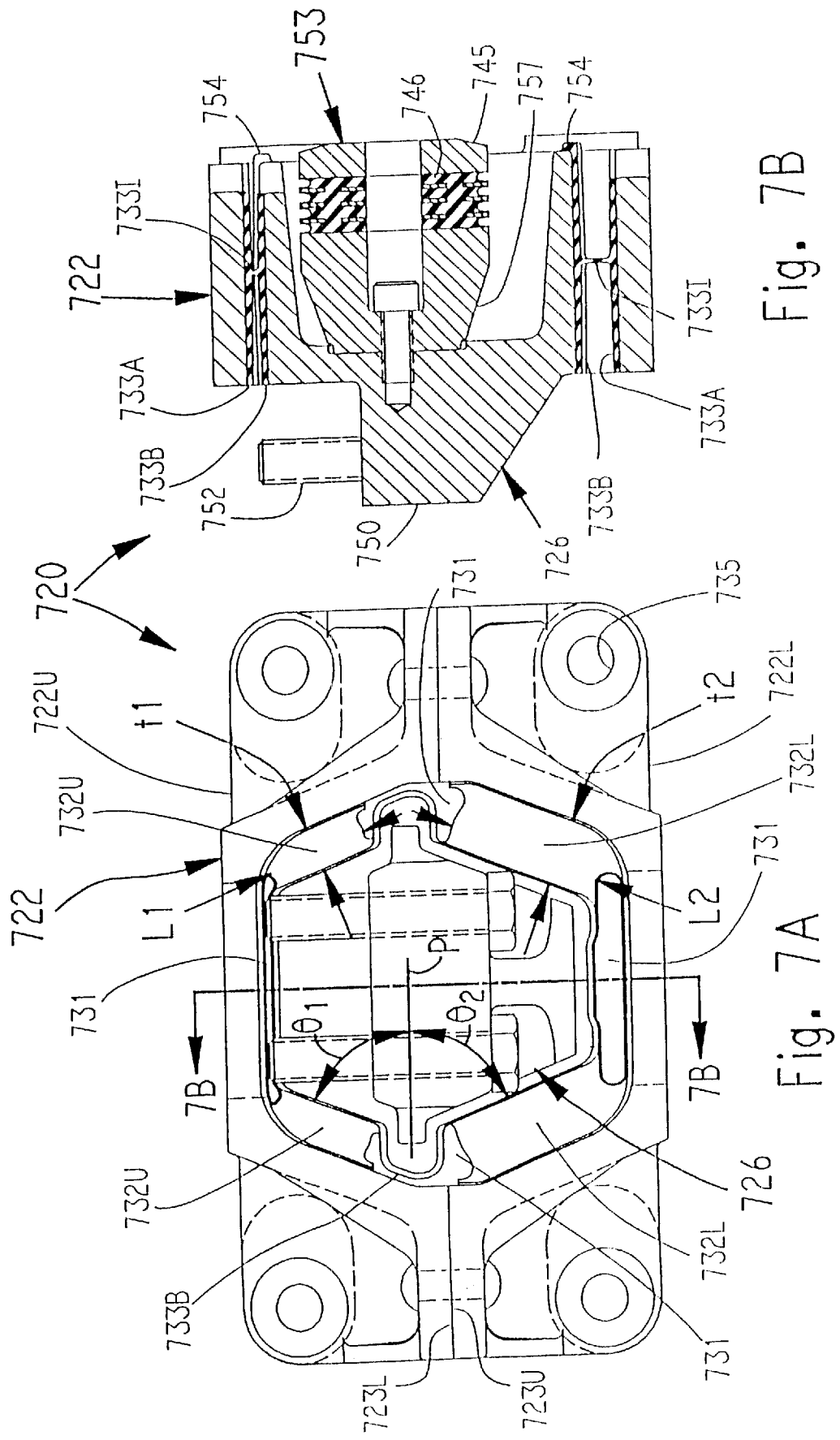
FIG. 7A is an front view of an eighth embodiment of the mount.
FIG. 7B is a cross-sectional side view of an eighth embodiment of the mount along the section line 7B—7B shown in FIG. 7A.

An eighth embodiment of the mount of the present invention is shown in FIGS. 7a and 7b generally at 720. This embodiment of the mount 720 is also a split (bifurcated) outer member design as is the FIGS. 2a and 2b embodiment employing upper element 722U and lower element 722L. Holes such as 735 are used to bolt the outer member 722 to the support frame, commonly a truck chassis. The inner member 726 is best seen in FIG. 7B. Compartments 731 are formed by the use of cores in the mold and an intermediate web 733I interconnects outer web 733A and inner web 733B. A shelf 750 protrudes from the front side of inner member 726 and provides a means for securing mount 720 to the engine (not shown). A flange extends from the rear of the engine and apertures therein receive bolts 752. The apertures in the flange may be attached as heretofore mentioned.

As was the case of the FIGS. 2a and 2b embodiment, when the mating surfaces 723U, 723L are drawn together from their pre-assembly position to their fully assembled position shown in FIG. 7A, upper and lower elastomeric components 732U, 732L are preloaded in both compression and shear. Preferably, in another aspect of the present invention, movement of the inner member 726 relative to outer member 722 will be snubbed in all three orthogonal directions. Vertical movement is snubbed by means of compression of the intermediate web 733I and the engagement of web 733A with web 733B. Fore-and-aft movement may be snubbed by means of the engagement of the elastomeric web 733B encasing inner member 726 with the fore-and-aft inner surfaces of the outer member 722. Elastomeric protrusions 754 as illustrated in FIG. 7B are formed on the outward face of inner member 726 will snub lateral motion against the support frame (not shown). This three axis snubbing prevents mechanical chatter during operation and prevents elastomer overloading.

he first variation discussed in connection with the first embodiment embodies varying the width of the upper elastomeric components 732U relative to the lower ones 732L. In another variation, the thickness t1 of the upper elastomer sections 732U may differ (being preferably thinner) as compared to the thickness t2 of the lower section 732L. Third, the length L1 of the upper sections 732U may be different (preferably longer) than the length L2 of the lower section 732L. Notably, it is preferable that the incline angle of the upper and lower sections 732U, 732L from a horizontal plane intersecting the mount 720 (designated by line P) be the same, for example, an upper incline angle 1 is exactly equal to lower incline angle 2. In order to achieve the appropriate high fore-and-aft and lower vertical rates, it is preferable that the angle be greater than about 45 degrees. In particular, in a best mode, it is desired to achieve a 3 to 1 ratio of fore-and-aft spring rate to vertical spring rate. This is achieved by using about a 68 degree angle 1, 2. Notably, in the FIGS. 4a and 4b concepts having a bifurcated inner member, the upper elastomer components are preferably longer, wider, and thicker than the lower sections, as they predominantly carry the loads.

Preferably, one or more of these above-mentioned three features are incorporated and result in a spring rate of the lower section 732L which is greater than that of the upper section 732U. Preferably, the stiffness of the lower elastomer 732L in the vertical direction is two or more times stiffer, and more preferably about a factor of four stiffer, than the upper section 732U.

A removable lateral portion 753 is detachable from the inner member 722 and includes a laminated elastomer and shim lateral section 746 which provides additional lateral stiffness. In this embodiment, the lateral portion is removable for ease of tuning and substitution for different applications. The elastomer section 746 is bonded to the base portion 757 and the plate 745. Preferably, the lateral stiffness element increases the vertical stiffness to lateral stiffness ratio to about 1 to 4 or greater.

Referring to FIGS. 8A–8E, there is shown a ninth embodiment of a mount 820 according to the invention which includes two chevron-shaped elastic assemblies 822a and 822b of mirror symmetry preloaded in compression between an outer member 824 and an inner member 826.

Outer member 824 is a singular component defined by two parallel spaced brackets 824a and 824b projecting from a base 828 suitable for connecting to a support structure such as a vehicle chassis. Mutually facing sides of brackets 824a and 824b diverge symmetrically from each other on opposite sides of a plane $P_1$ and define planar upper and lower surfaces 830a and 830b inclined respectively outward at acute angles, $\theta_1$ and $\theta_2$ above and below a horizontal plane $P_2$ passing through a line of intersection of the upper and lower surfaces. The angle of inclination affects the vertical, and fore-and-aft spring rates in assemblies 822a and 822b.

Inner member 826 is also a singular component secured between brackets 824a and 824b by elastic assemblies 822a and 822b. Upper and lower surfaces 832a and 832b are formed on opposite sides of inner member 826 in parallel spaced relation to surfaces 830a and 830b an amount sufficient for retaining elastic assemblies 822a and 822b in a precompressed condition between brackets 824a and 824b.

Figure 8A:
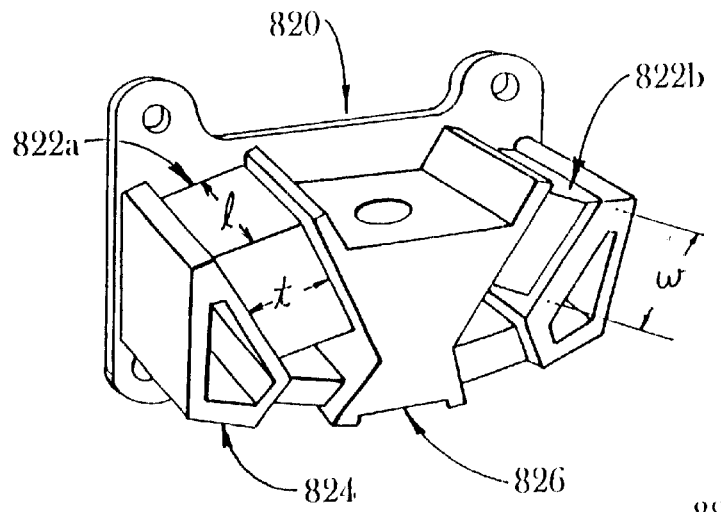
FIG. 8A is a pictorial representation of a ninth embodiment of the mount as assembled in a preloaded condition.
Figure 8E:
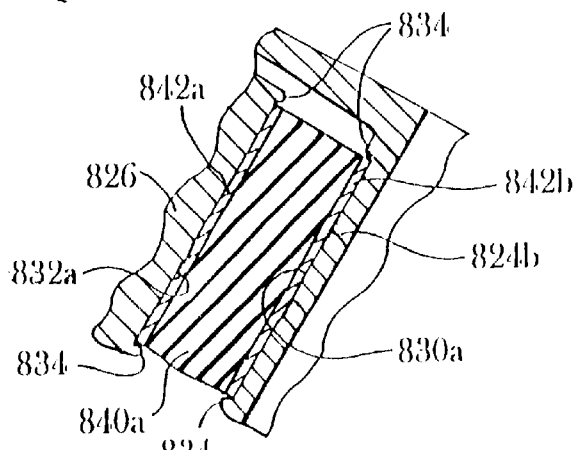
FIG. 8E is a view in cross section of an elastomeric element in the mount taken in a plane along the line 8E—8E of FIG. 8B.
Figure 8B:
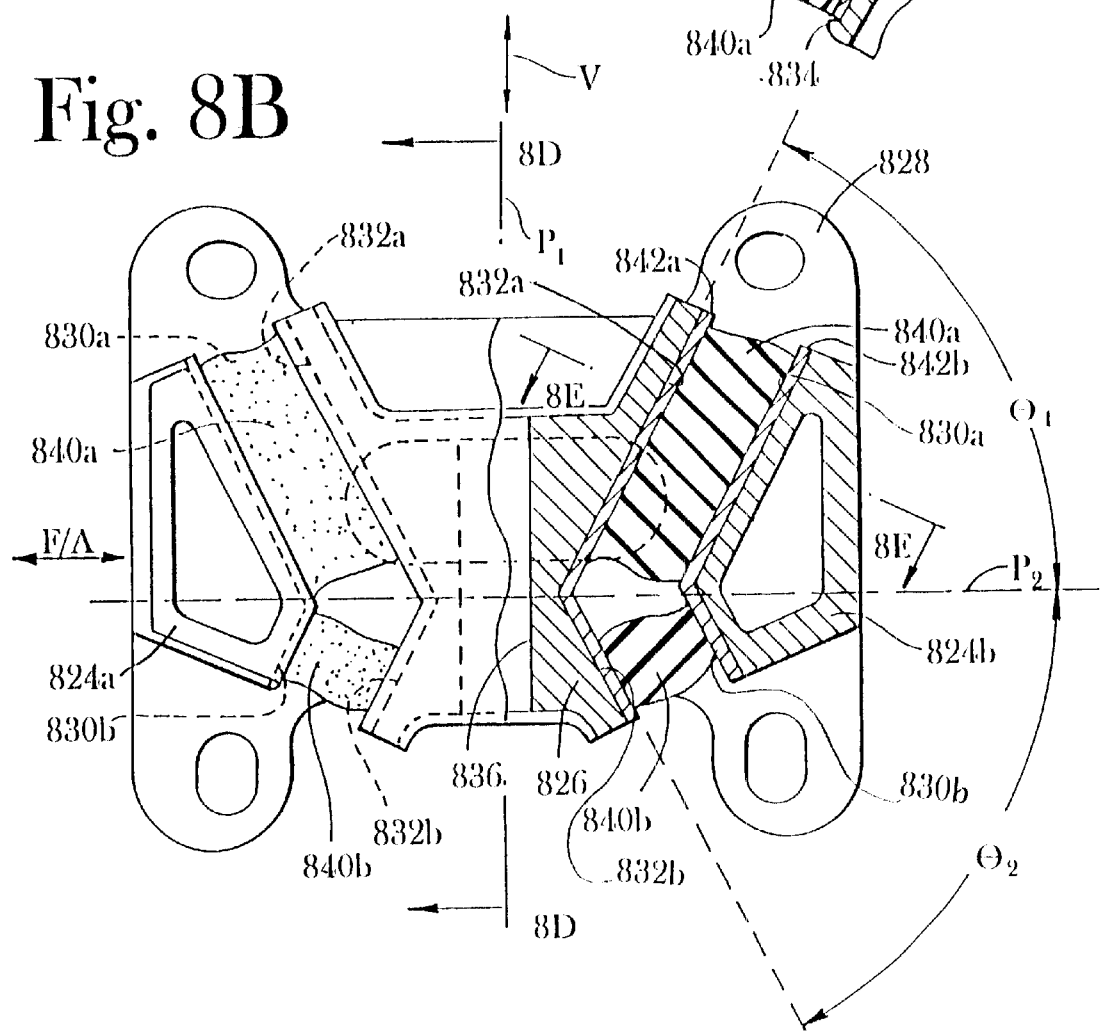
FIG. 8B is a front view, partially in vertical cross section of the mount of FIG. 8A.
Figure 8C:
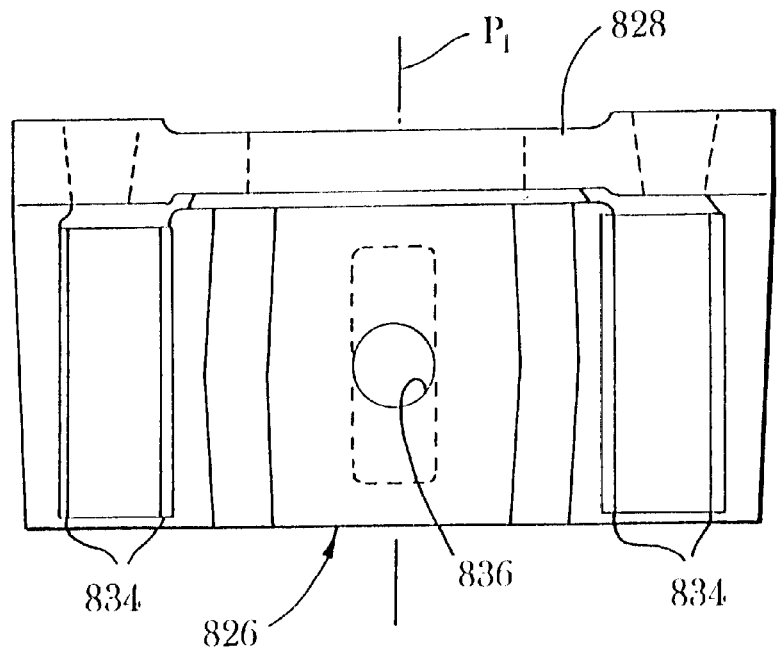
FIG. 8C is a top view of the mount.
Figure 8D:
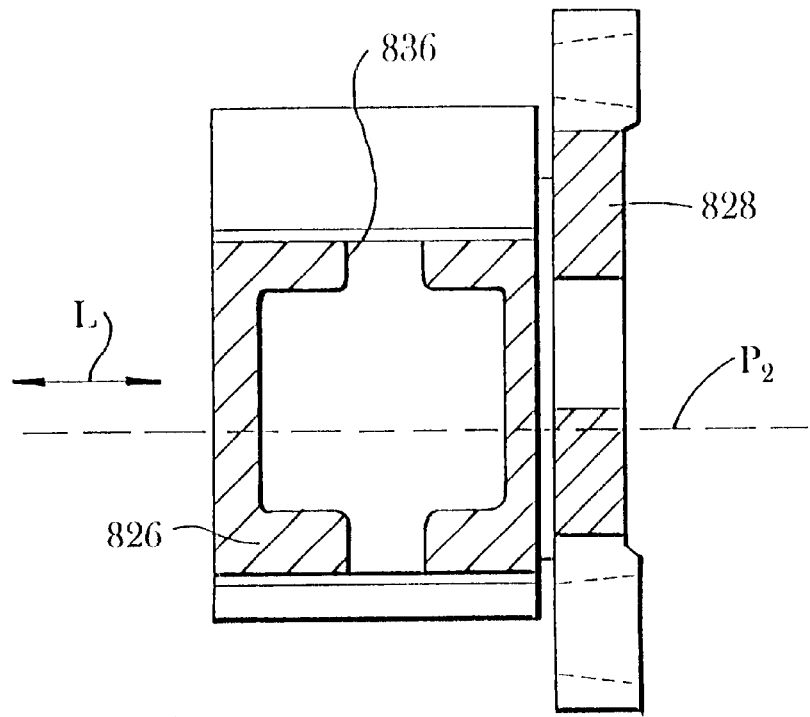
FIG. 8D is a view in cross section of the mount taken in a plane along the line 8D—8D of FIG. 8B.

As best illustrated in FIGS. 8C and 8E lips 834 at the opposite ends of surfaces 830a, 830b, 832a and 832b (FIG. 8B) form pockets for installing and positively restraining the elastic assemblies 822a and 822b in place. A hole 836 through inner member 826 along the symmetrical axis is formed to receive a connecting pin or bolt on a supported structure such as an engine.

As best seen in FIGS. 8B and 8E elastic assemblies 822a and 822b each comprise upper and lower elastomeric elements 840a and 840b bonded on opposite sides to inner and outer stamped plates 842a and 842b, sized and angled to fit snugly in the pockets of recessed surfaces 830a and 830b and surfaces 832a and 832b. The resulting X-configuration of assemblies 822a and 822b thusly formed in a vertical plane serves to isolate vibratory disturbances with equivalent efficiency under both positive and negative vertical loading conditions.

Precompression of elastic assemblies 822a and 822b enhances durability and increases load-carrying capacity of the mount. The precompression process is known in general. The outer member 824 is clamped in a jig with a funnel having spout openings congruent and communicating with the space between brackets 824a and 824b. The elastic assemblies are fit into the inner member 826 and together are placed in the top of the funnel in alignment with the spout openings and compressed through the spout openings into the pockets between members 824 and 826. The spring rates in shear and compression and the amount of construction determines the preload placed in the assembled mount.

A mount actually constructed according to the invention employed single castings of outer and inner members 824 and 826. Upper and lower elastic assemblies 822a and 822b are inclined equally at angles $\theta_1$, and $\theta_2$ of 68 degrees above and below a horizontal plane through brackets 824a and 824b. Elastomeric elements 840a and 840b are of natural rubber with a hardness of 56 durometers Shore A, 39 cm thick(t), and 78 cm wide (w). The lengths (l) of upper and lower elements 840a and 840b are 73 cm and 20 cm, respectively. These design parameters provide soft vertical and lateral nominal spring rates with a stiffness ratio of lateral and fore-and-aft loading to vertical loading being 0.5 and 3.0, respectively, as is generally desired in on-highway truck engine installations.

Referring now to the tenth embodiment in FIGS. 9A–9D, an engine mount indicated generally by the number 920 includes a pair of chevron-shaped elastic assemblies 922a and 922b pre-loaded in compression between outer and inner members 924 and 926 to form an X-configuration like mount 820 in FIGS. 8A–8E.

Outer member 924 defines two cantilevered surfaces 924a and 924b projecting in parallel from a generally rectangular base 928 with a pair of inclined inwardly facing upper surfaces 930a diverging symmetrically from each other on opposite sides of a vertical plane $P_1$ and extending upwardly from respective spaced apart central locations on a plane $P_2$ normal to plane $P_1$; and a pair of inclined inwardly facing lower surfaces 930b diverging symmetrically from each other on opposite sides of plane $P_1$ and extending from a respective one of the central locations in a downward direction. Suitable angles of inclination are as described for engine mount 820 supra. Flanges 925 at the respective four corners of base 928 include holes 925a generally aligned within the vertical bounds of outer surfaces 930a and 930b for receiving bolts on a supporting structure such as a vehicle, not shown.

Inner member 926 is interposed between cantilevered brackets 924a and 924b with outwardly facing upper and lower surfaces 932a and 932b in parallel spaced relation to upper and lower surfaces 930a and 930b, respectively.

Inner and outer members 924 and 926 are castings of high strength ductile iron for strength and durability. Elongate hole 927 extends vertically through inner member 926 with its major axis in plane $P_1$ for receiving a connecting pin or bolt of a supported structure such as an engine. As described below, axial hole 927 also provides a convenient receptacle for a tool employed when assembling mount 920.

Elastic assemblies 922a and 922b each comprise upper and lower elastomeric elements 934a and 934b respectively compressed between inner and outer retaining plates 936 and 938. The plates are formed to fit snugly between opposed upper surfaces 930a and 932a and lower surfaces 930b and 932b. Elements 934a and 934b may be made of natural rubber, neoprene, Buna, nitrile, etc. to provide soft vertical and lateral nominal spring rates with a stiffness ratio like the elements of mount 820 supra. Retaining plates 936 and 938 are preferably stamped from a high-strength, cold-rolled steel sheet, grade 80 and, if desired, may be bonded to elastomeric elements 934a and 934b with an adhesive such as Lord Chemical Products 410/#19 Modified Acrylic Adhesive after assemblies 922a and 922b are manufactured.

An upper end 936a of each inner retaining plate 936 folds inwardly approximately 180 degrees and grips a lip 940 extending along an upper end of the adjacent surface 932a; and both upper and lower ends 938a and 938b of each outer retaining plate 938 fold outwardly approximately 90 degrees with lower end 938b tightly gripping respective adjacent ends of lower surfaces 930b. Upper end 938a helps lock assemblies 922a and 922b in place. Grooves 942 running in vertical planes along both sides of each surface 930a, 930b, 932a and 932b with rims 944 on the outer sides raised slightly above the surfaces to form a pocket seating retaining plates 936 and 938. The resulting assembly positively retains elastic assemblies 922a and 922b against displacement under repetitive loadings as well as provides isolation from vibratory disturbances with equivalent efficiency in both positive and negative vertical loadings.

Figure 9D:
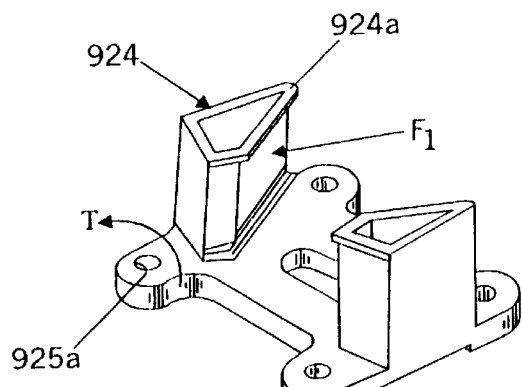
FIG. 9D is a perspective view of an outer member of the engine mount of FIG. 9A.
Figure 10A:
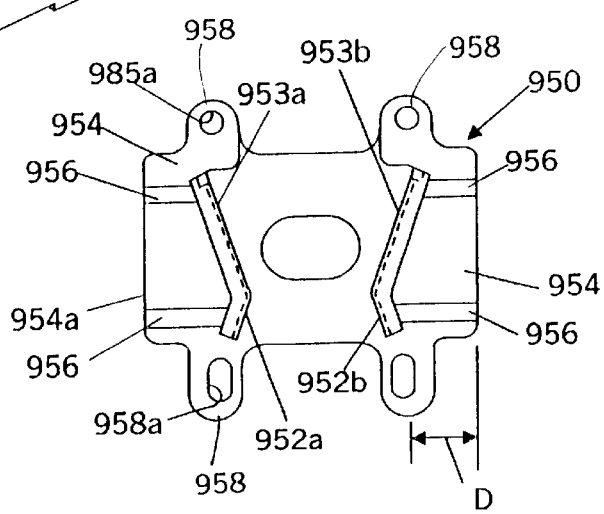
FIG. 10A is a view of an alternate configuration of the outer member of FIG. 9A.
Figure 10B:
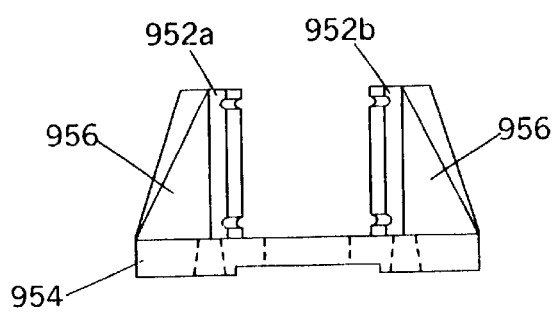
FIG. 10B is a side view of the outer member of FIG. 10A.
Figure 10C:
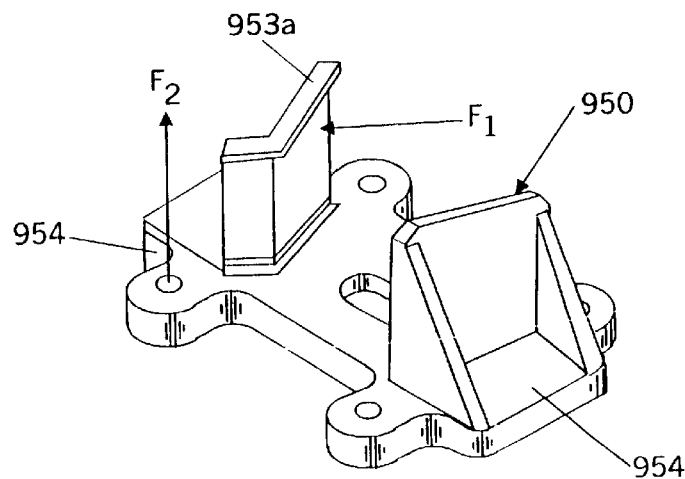
FIG. 10C is a perspective view of the outer member of FIG. 10A.

An alternative design for the outer member of the engine mount 920 is disclosed for reducing bending stresses on the engine mount fastening bolts, and for allowing the substitution of a material for the inner and outer members 924 and 926 which is lighter, rust-resistant and easier to fabricate than cast iron. Referring to FIGS. 10A and 10B, an outer member indicated generally by the number 950 is a ductile iron casting or high strength aluminum and includes two parallel spaced brackets 952a and 952b with inclined facing surfaces 953a and 953b reinforced by lateral braces 956 projecting from a generally rectangular base 954. Flanges 958 have bolt holes 958a generally aligned within the vertical bounds of facing surfaces 953a and 953b. Base 954 defines ends 954a which extend in both directions a distance D substantially beyond the lateral positions of bolt holes 958a to provide counter-torques to the outward forces imparted to the brackets 952a and 952b by the pre-compressed elastomeric element. Undesirable tensile and compression stresses of the connecting bolts due to bending, as may occur in the fastening bolts of mount 920, are thereby reduced substantially to a uniform tensile stress across the bolt. As illustrated in FIG. 9D, a force F applied to bracket 952a will produce a moment, $\Gamma$ at bolt hole 925a and a bending stress in a fastening bolt, not shown, through the hole; whereas a force $F_1$ imparted to bracket 952a will substantially produce a tensile stress $F_2$ and a counter-force at the extended 954a.

In inner member, not shown, may be fabricated of either ductile cast in or aluminum.

Assembly of the engine mount of either FIGS. 9A–9D or 10A–10C is simplified. Base 920 is rigidly secured by a jig or vise and elastic assembly 922a is placed on outer bracket surfaces 930a and 930b. The other elastic assembly 922b is placed on inner member surfaces 932a and 932b. With the aid of a rigid bar inserted through holes 927, inner member 924 is pressed against the face of elastic assembly an amount sufficient for the outer surface of elastic assembly to slide into place against the facing surface of bracket 924a and base 928 to complete the assembly.

Various changes, alternatives and modifications to invention will become apparent to one of ordinary skill in the art after a reading of the foregoing specification. It is intended that all such changes, alternatives and modifications as come within the scope of the appended claims be considered part of the present invention.

What is claimed is:

1. An X-configuration mount for supporting and isolating one part from another, comprising:

an outer member formed to be connected to one of the parts, said outer member having a first pair of inclined inwardly facing surfaces diverging from each other on opposite sides of a first plane and extending in a first direction from respective spaced apart central locations in a second plane normal to said first plane, and a second pair of inclined inwardly facing surfaces diverging from each other on opposite sides of said first plane and extending from respective ones of said locations in a second direction opposite from said first direction;

an inner member formed to be connected to the other of the parts, said inner member having outwardly facing surfaces in parallel spaced relation to respective ones of said inwardly facing surfaces forming thereby opposed pairs of inwardly and outwardly facing surfaces, the inner member having a first outwardly facing surface and a second outwardly facing surface, the first and second outwardly facing surfaces each terminating in an outwardly directed edge, and said first and second outwardly facing surfaces of said inner member further comprising a lip formed along each of said terminating edges, each of said lip extending outwardly away from the respective terminating edge;

elastic means compressed between respective ones of said opposed pairs of inwardly and outwardly facing surfaces, each of said elastic means including an elastomer compressed between inner and outer plates contiguous with respective ones of said inwardly and outwardly facing surfaces, said inner plate having a folded end engaging said lip, and said outer plate having first folded ends engaging the adjacent ends of said first pair of inwardly facing surfaces.

2. The mount of claim 1 wherein said inner and outer member further comprise grooves along opposite sides of each of said inwardly and outwardly surfaces in planes normal to said first plane with raised rims on the outer sides forming a pocket for positively retaining said plates.

3. The mount of claim 2 wherein said folded ends of said inner plates turn back upon itself approximately 180 degrees with sufficient openings for said raised rims to pass through.

4. The mount of claim 1 wherein said inner member includes a central hole extending through said inner member in parallel with said first plane for receiving a tool for simultaneously installing said inner member and said elastic means in said outer member, and for connecting to one of the parts.

5. The mount of claim 1 wherein said outer member is a casting of high-strength ductile iron.

6. The mount of claim 1 wherein said outer member includes a generally rectangular base with holes in the respective corners generally located within vertical boundaries of said inwardly and outwardly facing surfaces for receiving fastening bolts of the one part.

7. The mount of claim 6 wherein said outer member defines ends extending in opposite directions a selected amount beyond said vertical boundaries of said opposed facing surfaces to provide a counter-torque to outward forces imparted to said inwardly facing surfaces.

8. The mount of claim 7 wherein said outer member is a casting of aluminum.

9. An isolation mount, comprising:

an inner member having two extending members defining a first pair of outwardly facing surfaces diverging symmetrically outward from separate locations in a central plane between said extending members, and a second pair of outwardly facing surfaces diverging symmetrically outward from respective ones of said locations in an opposite direction from said first pair of outwardly facing surfaces, said extending members having a raised lip along an outer edge of each of said first pair of outwardly facing surfaces thereof, the lip extending outwardly from said respective outer edge;

an outer member having first and second pairs of inwardly facing surfaces substantially in parallel spaced relation to respective ones of said first and second pair of outwardly facing surfaces of said extending members forming thereby opposed pairs of inwardly and outwardly facing surfaces;

elastic means compressed between respective ones of said opposed pairs of inwardly and outwardly facing surfaces each of said elastic means including inner and outer plates, each of said inner plates being contiguous with said inner member and engaging said lip, and each of said outer plates contiguous with said outer member and engaging the respective ends of said first pair of inwardly facing surfaces.

10. The mount of claim 9 wherein said outer member further comprises grooves along opposite sides of each of said inwardly facing surfaces in planes normal to said first plane with raised rims on the outer sides forming a pocket for positively retaining said plates.

11. The mount of claim 10 wherein said folded ends of said inner plates are turned back approximately 180° with sufficient openings for said raised rims to pass through.

12. The mount of claim 9 wherein said outer member includes a generally rectangular base with holes in the respective corners generally located within the vertical bounds of said inwardly and outwardly facing surfaces to receive a fastening bolt of the one part.

13. The mount of claim 12 wherein said outer member defines ends extending in both directions a selected amount beyond the vertical bounds of said inwardly and outwardly facing surfaces to provide a counter-torque to outward forces imparted to said inwardly facing surfaces.

14. The mount of claim 2 wherein said outer plates each includes a second folded end engaging the adjacent end of said second outwardly facing surfaces.

15. The mount of claim 1 wherein said outer member is a casting of aluminum.

16. The mount of claim 1 wherein said outer member is a ductile iron casting and said inner member is an aluminum casting.

17. The mount of claim 1 wherein said outer member is an aluminum casting and said inner member is a ductile iron casting.

* * * * *